United States Patent
Yanagisawa et al.

(10) Patent No.: US 6,752,699 B2
(45) Date of Patent: Jun. 22, 2004

(54) WORKING METHOD FOR CURVED SURFACE OF A WORK AND AN APPARATUS THEREOF

(75) Inventors: Katsura Yanagisawa, Kitasaku-gun (JP); Tsugihiko Musha, Kitasaku-gun (JP); Hisato Kobayashi, Kitasaku-gun (JP); Gen Sasaki, Kitasaku-gun (JP); Koichi Takemoto, Kitasaku-gun (JP)

(73) Assignee: Minebea Co., Ltd., Kitasaku-gun (JP)

( * ) Notice: Subject to any disclaimer, the term of this patent is extended or adjusted under 35 U.S.C. 154(b) by 0 days.

(21) Appl. No.: 10/245,279

(22) Filed: Sep. 18, 2002

(65) Prior Publication Data

US 2003/0017789 A1 Jan. 23, 2003

Related U.S. Application Data

(63) Continuation of application No. 09/469,268, filed on Dec. 22, 1999.

(30) Foreign Application Priority Data

Aug. 26, 1999 (JP) .......................................... 11-239643

(51) Int. Cl.[7] .............................................. B24B 1/00
(52) U.S. Cl. .......................................... 451/56; 451/72
(58) Field of Search ............................ 451/53, 55, 56, 451/36, 72, 41; 204/217, 225, 662; 205/662, 663

(56) References Cited

U.S. PATENT DOCUMENTS

| 4,236,985 A | 12/1980 | Grodzinsky et al. |
| 4,328,083 A | 5/1982 | Kimoto et al. |
| 5,071,525 A | 12/1991 | Ushiyama |
| 5,091,067 A | 2/1992 | Ushiyama et al. |
| 5,547,414 A | 8/1996 | Ohmori |
| 5,833,520 A | 11/1998 | Kanda et al. |
| 6,113,464 A | 9/2000 | Ohmori et al. |
| 6,113,484 A | 9/2000 | Ohmori et al. |
| 6,162,348 A | 12/2000 | Ohmori |

FOREIGN PATENT DOCUMENTS

| JP | 1-188266 | 7/1989 |
| JP | 7-1333 | 1/1995 |
| JP | 7-227761 | 8/1995 |
| JP | 8-257912 | 10/1996 |

*Primary Examiner*—Dung Van Nguyen
(74) *Attorney, Agent, or Firm*—Oliff & Berridge PLC

(57) ABSTRACT

The first driving shaft 2 is provided with the electric supply equipment 8 such as the metal brush. The second driving shaft 3 is as well too. Further, a nozzle 10 for supplying the conductive coolant is supplied to the grinding portion between the grinding surface 1a and the surface Wa to be ground is provided. When grinding is carried out, the conductive coolant is supplied from the nozzle 10 and by turning on the electricity to the first driving shaft 2 and the second driving shaft 3, a voltage is applied between the grinding surface 1a and the surface Wa to be ground of the work W. Due to electrolysis of that instance, the conductive material of the surface of the grindstone is dissolved in the conductive coolant, simultaneously the clogging of the grinding surface 1a is solved. Accordingly, a super ball finishing using a grindstone of the quite high grain size becomes possible.

2 Claims, 3 Drawing Sheets

WORKING METHOD FOR CURVED SURFACE OF A WORK AND AN APPARATUS THEREOF

This is a Continuation of application Ser. No. 09/469,268 filed Dec. 22, 1999. The entire disclosure of the prior applications is hereby incorporated by reference herein in its entirety.

BACKGROUND OF THE INVENTION

1. Field of the Invention

This invention relates to a grinding method for curved surface of a work having a concave surface such as a spherical surface of a given radius and a concave and curved surface of a bearing groove and an apparatus thereof.

2. Conventional Art

As a working apparatus for carrying out a precision grinding on a spherical surface such as a rod end of a ball joint, there is what is shown in FIG. 4. A configuration of a grindstone 1 is cylindrical as a whole, and at its inner end of the cylinder portion a conical grinding surface 1a of a given width (hereinafter referred to as "cup grindstone") formed by applying a chamfer is formed. The diameter of the cup grindstone 1 and the inclination angle of the conical grinding surface are selected in accordance with a configuration of a work W.

And the cup grindstone 1 is installed in the driving shaft 2 rotating toward a direction of an arrow A (hereinafter referred to as "the first driving shaft") and the grinding surface 1a is driven to rotate in a circumferential direction. Further, it is provided with a displacing means not shown in which, in a state where a driving shaft 2 is driven to rotate, the grinding surface 1a is made to be displaced toward the direction B.

The work W, as a surface Wa to be worked, has a spherical surface which remains a finishing process to be applied for grinding. Further, the work W has a through hole, which is coupled with and fixed to a driving shaft 3 (hereinafter referred to also as "the second driving shaft") which is rotated on an axis perpendicular to the first shaft 2 in the direction of arrow C.

And, in a state where the cup grindstone 1 is made to rotate in the direction of arrow A and the work W is made to rotate in the direction of arrow C, the cup grindstone 1 is made to get close to the work W. Then, the total surface (circumference) of the grinding surface 1a abuts to the surface Wa, which is the grinding surface of the work, and generates a three-dimensional relative displacement between the grinding surface 1a of the grindstone 1 and the surface Wa to be ground of the work W. Such three-dimensional relative displacement provides a high precision roundness or surface roughness.

By the way, in the case where a grinding is carried out by not only a cup grindstone 1 but also another grindstone, it is necessary to carry out a dressing on the grinding surface of the work after a given time period of working. This is because fine particles ground by the grindstone grains and the grindstone grains peeled off the grindstone are clogged with the grinding surface. Such clogging becomes more outstanding in proportion to the fineness of the grindstone grain which makes a super precise grinding difficult.

In order to solve the above problem, a dressing method in which the ground working and the dressing process are carried out simultaneously is disclosed in the patent laid open Nos. Hei 1-188266 and Hei 7-1333 and so on. Such dressing method is explained in accordance with FIG. 5. As a grindstone 4, what contains a conductive material is used. Furthers electrodes 5 are disposed opposing each other on the grinding surface 4a of the grindstone 4. Further, a nozzle 6 for applying a conductive coolant on the grinding surface 4a between the electrodes is disposed nearby. And, an electric supply equipment 7 for supplying an electricity to the grindstone 4 is provided on the grindstone 4, which is connected to the electric source not shown.

Now, at the time of grinding a surface Wa' of a work W' by rotating the grindstone 4 in the direction of arrow D, the conductive coolant is supplied to the grinding surface 4a and the grinding portion of the electrodes 5 from the nozzle 6 and the electricity is supplied through the electrodes 5 and the electric supply equipment 7, then between the grinding surface 4a and the coolant a voltage is applied to generate an electrolytic effect. Due to this electrolytic effect, the conductive material on the grinding surface 4a is dissolved in the conductive coolants thereby the clogging on the grinding surface 4a is solved.

However, when applying the above dressing method on the spherical surface shown in FIG. 4, since the whole of the grinding surface 1a of the cup grinding stone 1 abuts to the surface Wa to be worked, the electrodes for applying the voltage to the grinding surface 1a could not be provided, in the case of working a spherical surface shown in FIG. 4, a dressing of in-process (an another process within other process) could not be carried out and as a result, there has been a defect that, even though the grain size of the grindstone is high, a desired surface roughness could not be obtained.

Further, in the case where not only the spherical surface working as shown in FIG. 4, but also a curved surface grinding due to generation of three-dimensional relative displacement between the grinding surface of the grindstone and the surface to be ground is carried ground, an arrangement for a complicated surface configuration to be followed by having an electrode followed the displacement of a grindstone has been difficult.

The present invention has been made in the light of the above problem, the purpose of it is to provide a spherical surface having a given radius or a concave surface of a work such as bearing groove with a high precision of roundness or a curved surface.

According to a first aspect of the method for working a curved surface of the present invention, the method is characterized in that, a three-dimensional relative displacement is made to be generated between a grinding surface of an conductive grindstone and a surface of a conductive work to be ground, when carrying out to grind a curved surface, while supplying an conductive coolant to a grinding portion of the work between the conductive grindstone and the conductive work and the work is ground while dressing the conductive grindstone by electrolytic effect.

According to the above invention, by applying a voltage to the grinding portion between the conductive grindstone and the conductive work, since the conductive material of the grindstone is dissolved in the conductive coolant, the clogging of the grinding surface of the conductive grindstone is avoided.

According to a second aspect of the method for working a curved surface of the present invention, whole of the grinding surface of the conductive grindstone is made to be abutted to the surface of the work to be ground, and at the time when grinding a curved surface while generating a three-dimensional relative displacement, a voltage is applied to a grinding portion between the conductive grindstone and a surface to be ground while supplying a conductive coolant thereto and a grinding is carried out while dressing the grindstone by electrolysis.

According to the above aspect of the present invention, in the case where a grinding work is carried out in such a manner as whole of the conductive grindstone abuts to the surface to be ground of the conductive work too, a voltage is applied to a grinding portion between the conductive grindstone and the conductive work and the conductive material on the surface of the conductive grindstone is made to be dissolved in the conductive coolant, thereby the clogging of the surface of the conductive grindstone is solved.

Further, according to a third aspect of an apparatus for working a curved surface of the present invention for solving the above problems, it comprises a driving means to generate a three-dimensional relative displacement between the grinding surface of the conductive grindstone and the surface to be ground of the conductive work, a coolant supplying means to supply the conductive coolant between the grinding surface of the grindstone and the surface to be ground of the conductive work and the electric supply equipment means to supply a current to the conductive grindstone and the conductive work.

According to the above invention, by the above driving means it is made to enable to work a desired curved surface and since a voltage is applied to the conductive grindstone by the above electric supply equipment and the conductive material of the grindstone of the surface of the conductive grindstone is dissolved in the conductive coolant supplied from the above mentioned supplying means, the above clogging of the grinding surface of the conductive grindstone is solved.

In addition, according to a fourth aspect of the curved surface processing apparatus, said conductive grindstone comprises a conical grinding surface, said driving means comprises the first driving shaft to rotate the conical grinding surface of the conductive grindstone in the circumferential direction on an axis perpendicular to the first driving shaft, and a displacement means which makes the first and second driving shafts come to close and separated each other.

According to the above constitution, while solving the clogging of the grinding surface of the conductive grindstone in an in-process, it becomes possible to make the three-dimensional relative displacement generated between the conical grinding surface of the conductive grindstone and the surface to be ground of the conductive work and give the surface to be worked of the conductive work a high precision of roundness or unevenness of the surface.

According to a fifth aspect of a curved surface working apparatus of the present invention, either one or both of the first and second driving shaft comprises a swinging means to swing around a crossing point of the axes of the first and second driving shafts. And, due to the generation of such mutual swinging motion between the first and second driving shafts, without changing the contacting state between the grinding surface 1a' and the surface Wa to ground, the grinding surface 1a' and the surface Wa to be ground in such a manner as it licks the surface.

EMBODIMENT

Hereinafter, an embodiment of the present invention will be explained based on the attached drawings. Now, signs identical with or relevant to the portions of the conventional art are indicated by the same signs and explanations thereof are omitted.

Figure 1:
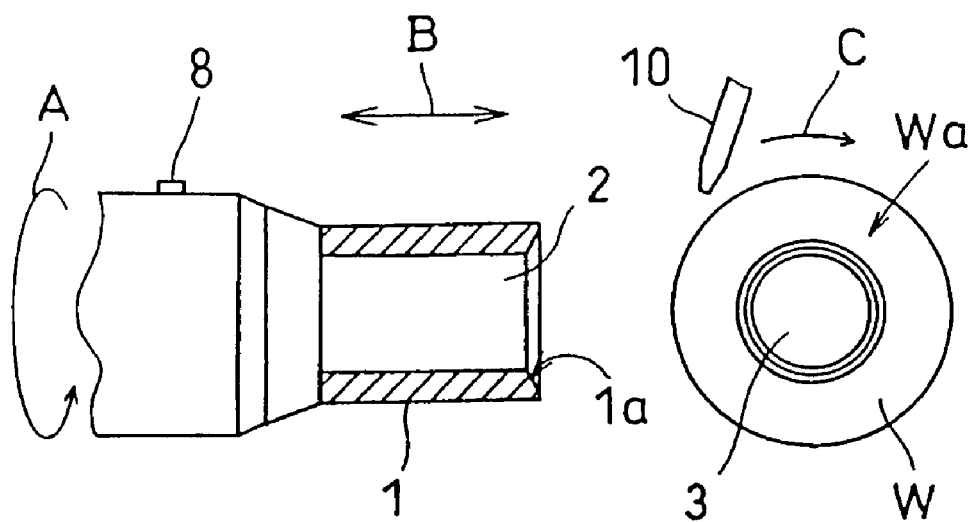
FIG. 1 is a general front view of an embodiment of a spherical surface working apparatus of the present invention.
Figure 2:
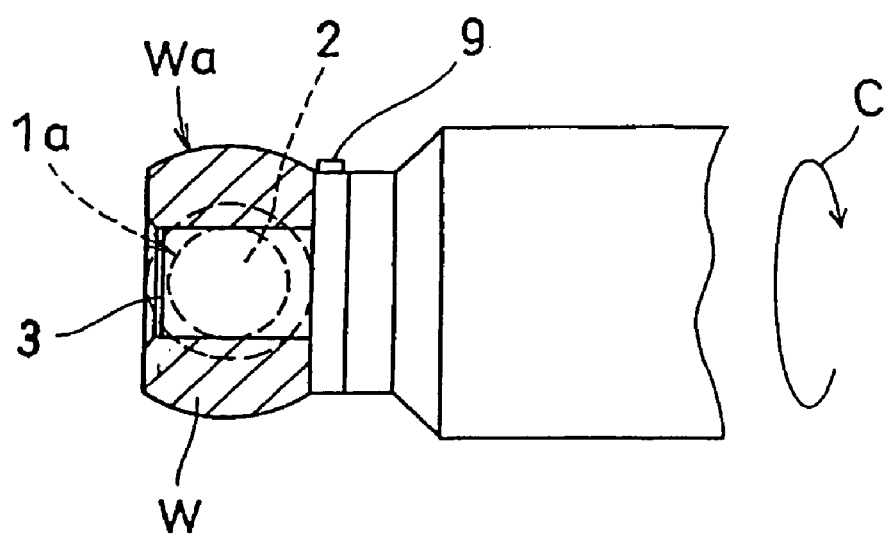
FIG. 2 is a side view of the spherical surface working apparatus shown in FIG. 1.

FIG. 1 shows a front view of a spherical surface working apparatus of the present invention. Further, FIG. 2 is a side view of the spherical surface working apparatus shown in FIG. 1. The cup grindstone 1 is installed on a first drive shaft 2 to rotate in the direction of arrow A, and its grinding surface 1a is driven to rotate in the circumferential direction. Further, a not shown displacement means to displace the rotary shaft 2 in the direction B in the state where the rotary shaft 2 is driven to rotate. The work W has the spherical surface unfinished for finishing to polish as a surface Wa to be worked, and is rotated by the second driving shaft 3 in the direction C on the shaft perpendicular to the first shaft 2. Now, the cup grindstone 1 is a conductive cast iron fiberbond diamond grindstone and the work W is formed with a conductive material such as a carbon steel. Further, both of the first driving shaft 2 and second driving shaft 3 is formed with a conductive material.

And, each of the first driving shaft 2 and the second driving shaft 3 is provided with electric supply equipments 8, 9 such as a metal brush, and between the grinding surface 1a of the cup grindstone 1 and the surface Wa of the conductive work to be ground around the area where the grinding surface 1a and the surface Wa to be ground contact, a nozzle 10 as a conductive coolant supply equipment is located.

In the state where the cup grindstone 1 is turned in the direction of arrow A and the work W is the direction of arrow C, the cup grindstone is made to come close to the work, whole of the grinding surface 1a abuts to the surface Wa to be ground of the work W to generate the three-dimensional relative displacement between the grinding surface 1a of the cup grindstone 1 and the surface Wa to be ground of the work W to obtain a high precision roundness or surface roughness.

Further, when grinding, by supplying the conductive coolant from the nozzle 10 between the grinding surface 1a of the cup grindstone 1 and the surface Wa to be ground of the work W and turning on electricity to the first driving shaft and the second driving shaft 3, a voltage is applied between the grinding surface 1a of the cup grindstone 1 and the surface Wa to be ground of the work W, and by electrolysis the conductive material on the surface of the grindstone is dissolved in the conductive coolant, thereby with such function the clogging of the grinding surface 1a is solved.

The operation and the effect of the present invention is as follows. First, since an electricity is adapted to be supplied between the cup grindstone 1 and the surface to be ground of the work W, without using an independent electrode to pair up with the cup grindstone 1, it becomes possible to apply voltage to the cup grindstone 1. Accordingly, in the case where, as the embodiment of the present invention, whole of the grinding surface 1a abuts to the surface Wa to be ground of the work W too, the grindstone dressing in-process becomes possible, and a super ball finishing using a grinding stone with quite high grain size; becomes possible. Conventionally, even a grain size #2000 grindstone causes to clog, and it has been impossible to improve the surface roughness more than the one attained by such grain size of a grindstone. However, according to the present embodiment, even a #300,000 grindstone does not cause to clog, which enables a quite precise working.

Figure 3:
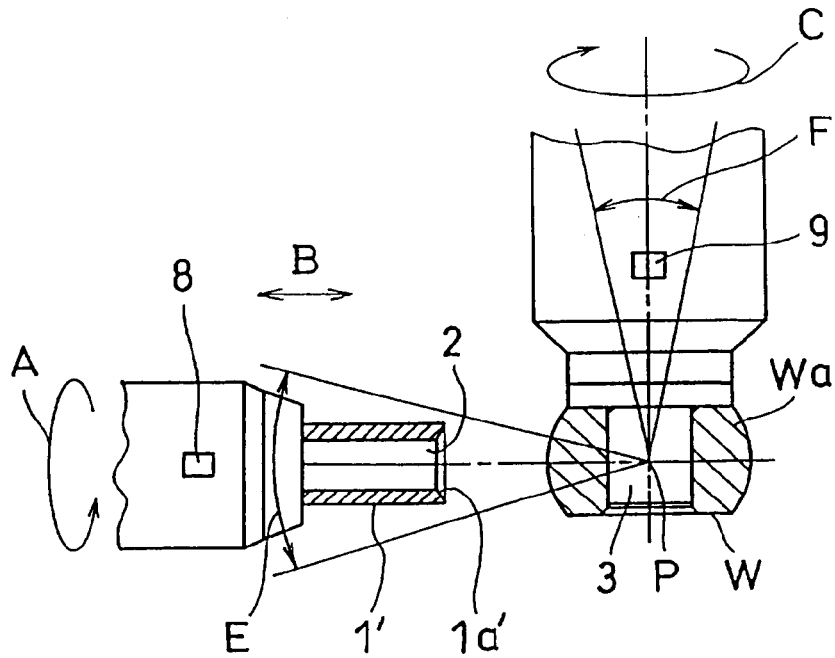
FIG. 3 is a general plan view showing a case where the spherical surface working apparatus of the embodiment has a swinging function.
Figure 4:
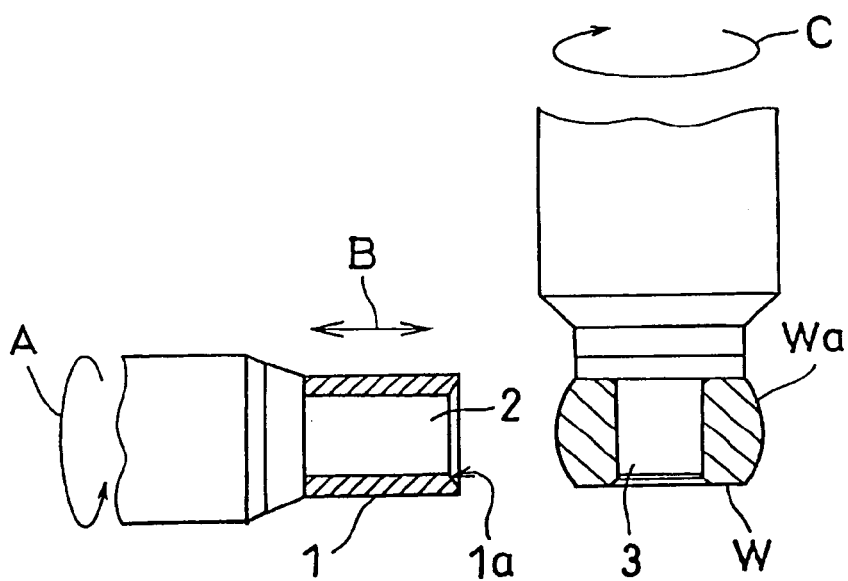
FIG. 4 is a general plan view showing a working apparatus which makes a precision polishing such a spherical surface as a rod end of a conventional ball joint.
Figure 5:
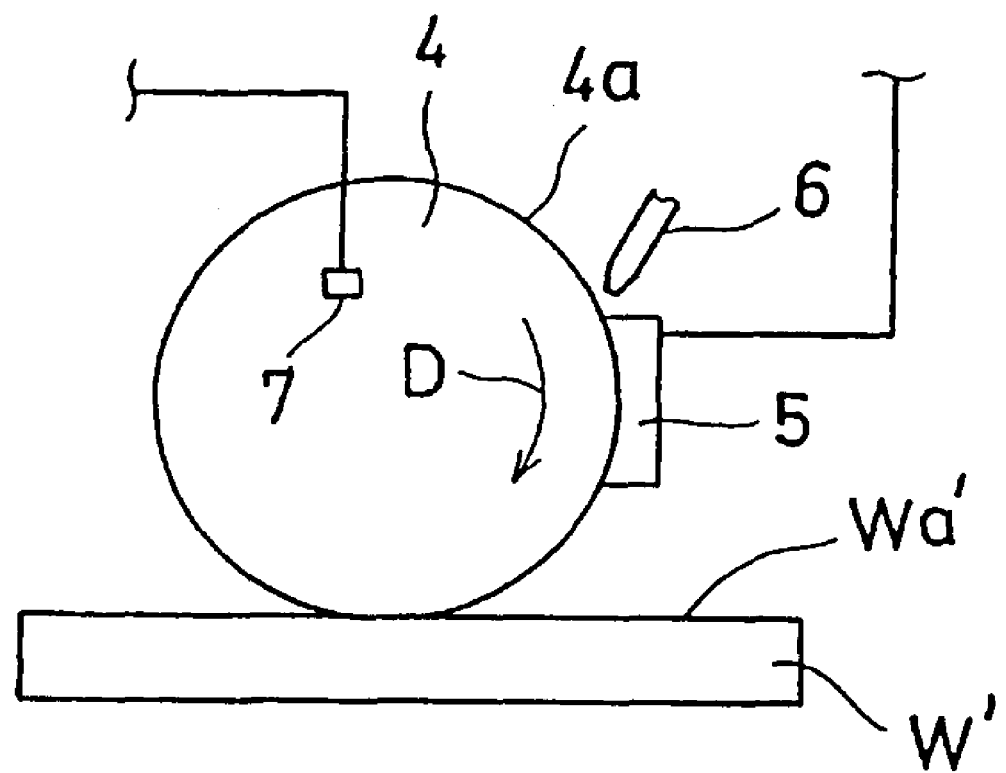
FIG. 5 is a schematic diagram showing an apparatus which carries out the dressing process simultaneously with conventional grinding working.

Further, a shown in FIG. 3, if a swinging means is provided around a crossing point P of the axis of the first driving shaft 2 and the axis of the second driving shaft 3 so as to swing either one of the first driving shaft 2 and the second driving shaft 3 or both with each other in the direction of arrow E, F, even if a smaller cup grindstone 1' mutually to the work W is used, to the whole of the surface Wa to be worked of the work W, the super finishing can be carried out. It is because by generating such a mutual swinging between the first driving shaft 2 and the second driving shaft 3 without changing the contacting state between the grinding surface 1a' and the surface Wa' to be ground the grinding surface 1a' displaces on the whole of the spherical surface in such a manner the grinding surface 1a' licks the surface Wa' to be ground. Similarly, it is possible to grind a work of further larger diameter (not shown), and select free the mutual size between the cup grindstone and the work.

Now, the present invention can be applied to not only the case where a precise grinding is carried out to a spherical surface, as shown in the above embodiment, such as the rod end of a ball joint, but also to the case where the grinding is carried out by a combination of a comparatively small grindstone and a work as a case where a grinding is carried out to a work having a curved and concave surface such as a bearing groove. In such an applied example too, since an independent electrode to pair with the grindstone becomes unnecessary, when a curved surface grinding is carried out by generating a three-dimensional relative deflection between the grinding surface of the grindstone and the surface to be ground of the work, it becomes unnecessary to prepare an countermeasure to make an electrode followed the grindstone displacement, and quite easy to cope with a complicated surface configuration.

Due to the above constitution, the present invention can expect the following effects. First, according to the first aspect of the present invention, to the work having a spherical surface having a given radius and a curved and concave surface such as a bearing groove, a more high precision roundness or improved surface roundness.

Further, according to the second aspect of the present invention, by the manner where whole of the grinding surface of the conductive grindstone abuts to the surface to be ground of the conductive work, when carrying out grinding the curved surface of a spherical surface having a given radius and the work having a curved and concave surface such as a bearing groove too, it becomes possible to obtain a high precision roundness or surface roundness.

Further, according to the third aspect of the present invention, when carrying out grinding the spherical surface having a given radius and the work having a curved and concave surface such as a bearing groove, since it becomes possible to carry out the dressing of the grindstone in an in-process, and use a grindstone having a quite high grain size, depending on the work a high precision roundness or an improved surface roughness is obtained.

Further, according to the fourth aspect of the present invention, the three-dimensional relative deflection is made to generate between the conical grinding surface and the surface to be worked of the conductive work and can give to the conductive work a spherical surface having a high precision roundness or an improved surface roughness.

Further, according to the fifth aspect of the present invention, it is become possible to select free the mutual size of the conductive grindstone and the conductive work.

What is claimed is:

1. A method for working a curved surface, comprising:

grinding a curved surface of a conductive work while generating a three dimensional relative deflection between a grinding surface of a conductive grindstone and a surface to be ground of the conductive work;

applying a voltage between the conductive grindstone and the conductive work to make the conductive grindstone functions as one of an anode and a cathode, and the conductive work functions as another anode and cathode while supplying a conductive coolant to a grinding portion between the conductive grindstone and the conductive work;

carrying out the grinding while dressing the conductive grindstone by electrolysis, wherein no electrically insulating material is required between points of application of the voltage and the conductive work; and swinging either one of a first shaft and a second shaft or both with each other by a swinging means.

2. A method for working a curved surface, comprising;

abutting a grinding surface of a conductive grindstone wholly to a surface to be ground of a conductive work;

generating a three dimensional relative deflection between the grinding surface and the surface to be ground, at the time of carrying out the grinding of a curved surface;

applying a voltage to a grinding portion between the conductive grindstone and the surface to be ground of the conductive work to make the conductive grindstone and the conductive work function as electrodes; and grinding the grinding portion while dressing the conductive grindstone by electrolysis, wherein no electrically insulating material is required between points of application of the voltage and the conductive work.

* * * * *